Figure 8:
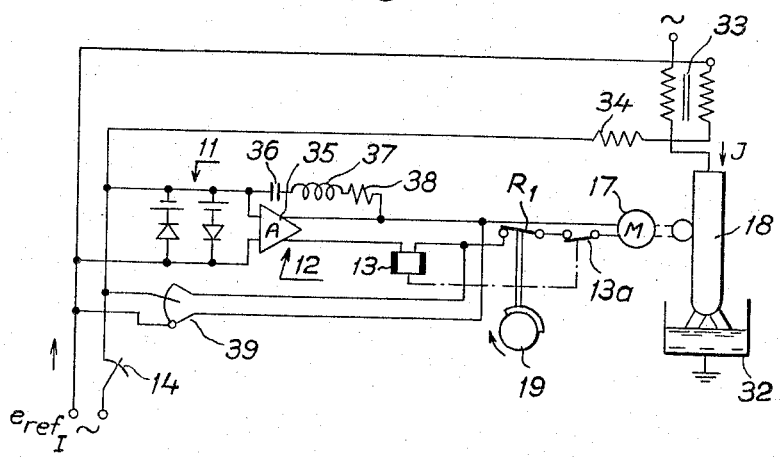

April 25, 1967     E. HELSING ETAL     3,316,340
REGULATING DEVICE FOR ELECTRODE FURNACES
Filed Oct. 21, 1965
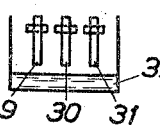
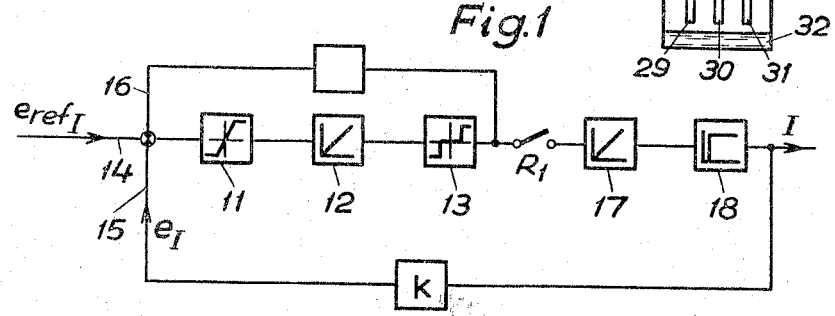
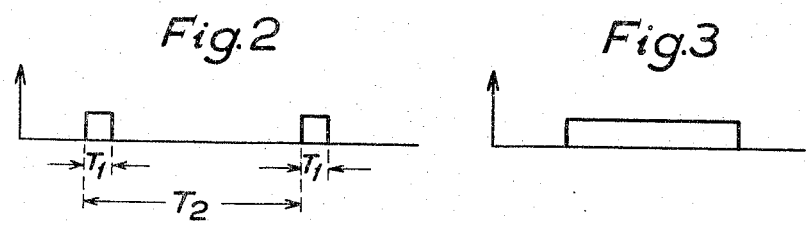
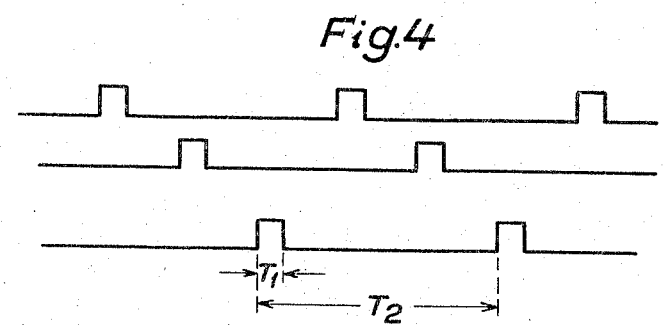
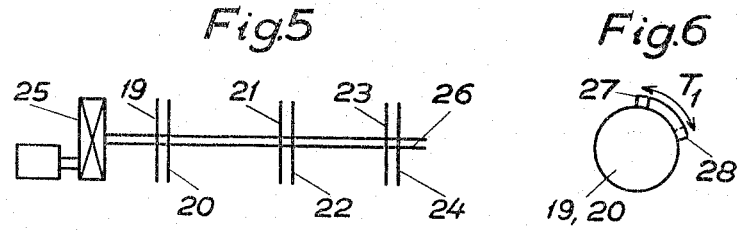
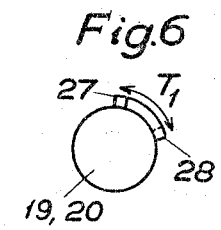
INVENTORS
ERIK HELSING
NILS-ERIK STRÖM
BY
ATTORNEYS United States Patent Office
3,316,340
Patented Apr. 25, 1967

3,316,340
REGULATING DEVICE FOR ELECTRODE FURNACES
Erik Helsing and Nils-Erik Strom, Vasteras, Sweden, assignors to Allmanna Svenska Elektriska Aktiebolaget, Vasteras, Sweden, a corporation of Sweden
Filed Oct. 21, 1965, Ser. No. 499,945
Claims priority, application Sweden, Mar. 2, 1962, 2,310/62, 2,312/62
5 Claims. (Cl. 13—13)

The present invention refers to regulating devices, for example electrode regulating devices for use with electrode furnaces.

This application is a continuation-in-part of application S.N. 262,707, filed Mar. 4, 1963, now abandoned.

With many regulating processes transient static changes occur in the curve of the measuring values, which there is no reason to attempt to correct or regulate. A typical case of this kind is electrode regulating of constant current, impedance or resistance in metallurgical furnaces. Should continuous and simultaneously fast regulation occur in such cases, a very disturbed furnace operation would be obtained, which would have an unsettling effect on the metallurgical or chemical processes. It is therefore generally not possible to use a fast regulation in such connections. If, for example, an integrating amplifier is used the integration constant of this must be chosen sufficiently low.

Thus, in such furnaces slow regulating devices should be used, which on many occasions are a disadvantage. This inconvenience may be overcome with existing systems by temporarily increasing the regulating speed, for example, by raising the integration constant of the integrating amplifier, which however as a rule demands retrimming of the system in order to obtain stability. The invention aims at a device for obtaining fast regulation and simultaneously steady operating conditions and relates to a regulating device of the kind indicated, including at least one integrating amplifier. The invention is characterized in that the amplifier is connected to an adjusting means, such as an adjusting motor for an electrode, through a contact means, arranged to make and break the connection according to a certain cyclical schedule. The contact means may comprise a cam disc device, time relays, electronic or transistor means or the like. With the integrating amplifier the measuring value may be integrated during and between the connections to the adjusting means. Elimination of the fault integrated in this way occurs only when the contact means has closed the connection between the amplifier and the adjusting means. Therefore it is possible to use an amplifier with higher integration constant than that possible with continuous connection. With many kinds of furnace, e.g. reduction furnaces of the Tysland-Hole type, the connection time of the contact means should be made relatively short, which makes possible a high integration constant. In this way fast regulation is obtained to any desired constant value and simultaneously steady operation of the regulated unit, for example the electrode furnace.

It is also possible, by keeping the contact means closed for a certain time, to trim the regulating device, readjust the reference value or also raise the regulating speed.

It is possible to use either a regulating device with contact means for each electrode or one or several regulating devices for all adjusting motors, said regulating devices being then connected in rotation to the different adjusting motors according to a set schedule. The latter embodiment is inexpensive and can be made fully effective.

The invention is more closely explained below and in the accompanying figures, of which FIGURE 1 shows a regulating circuit according to the invention, and FIGURES 2 and 3 show alternative time-connection schedules for a regulating circuit to an electrode. FIGURE 4 shows a time-connection schedule for regulation of a three-phase electrode furnace. FIGURES 5 and 6 show control means for the current adjuster in FIGURE 1.

FIGURE 7 shows schematically three electrodes in a metallurgical furnace; and FIGURE 8 shows in greater detail the circuit of FIGURE 1.

A three-phase electrode furnace is shown in FIGURE 7 and according to the invention it is intended to keep constant, for example, current impedance or resistance between electrodes 29, 30, 31 and the melt 32 of said furnace, which occurs by changing the electrode position by means of the conventional adjusting motor.

Regulation according to the above may occur by means of a device according to FIGURE 1. In this figure is shown the block pattern for a regulating device with an amplitude limiter 11 and an integrating amplifier 12 and an on-and-off connecting device 13, such as a relay or the like. At 14 a reference signal ($e_{ref,I}$) is fed in and at 15 the measuring value $e_I$ is fed in, for example for the current, impedance or resistance in the furnace phase. The integrating amplifying circuit is in a suitable way fed back (16) in order to obtain stable regulation. $R_1$ indicates a suitably time-controlled contact means for production of a cyclical connection of the regulating device to an adjusting means 17, such as adjusting motor 17 of the electrode 18.

The connection may be made according to FIGURE 2 with a connection time $T_1$, forming a fraction of the revolution time $T_2$, suitably at the most 20% of this. With trimming, reference readjustment, necessity for greater regulating speed, etc., however, $R_1$ may be closed for longer times (for example according to FIGURE 3). The cyclical schedule for the whole furnace plant appears as in FIGURE 4, in which the three furnace phases are drawn. As an example may be mentioned $T_1=5$ sec., $T_2=64$ sec., that is, $T_1:T_2=7.8\%$. $T_1:T_2$ may for example vary between 5 and 15%.

With operation according to the mentioned schedule, the integrating amplifier 12 may be given a high integration constant and high regulation speed in the connection intervals, with the maximum value $T_1$. As a measure of the integration constant may be mentioned that, when $T_1:T_2=10\%$, ten times as great an inclination for the integration curve and thus integration constant may be allowed than with $T_1:T_2=100\%$. The control of $R_1$ may take place by means of a cam disc device according to FIGURES 5 and 6. The cam discs (19, 20, 21, 22, 23 and 24) are placed in pairs for each phase on an axle 26 driven by a suitable gear 25. Cams 27, 28, pegs or the like on the discs shown in FIGURES 5 and 6, are adjustable around the periphery of the different discs. The peripheral distance between two pegs (27 and 28 in FIG. 6) corresponds to the duration of $T_1$ if a whole revolution of discs 19 and 20 is $T_2$. $T_1$ may thus be varied in relation to $T_2$ by a certain mutual displacement of one or both the pegs 27 and 28, and thus the relation $T_1:T_2$ is changed. For the other disc pairs 21–22 and 23–24 a different relation $T_1:T_2$ (for another regulator) may be chosen. The devices in FIGURE 5 and FIGURE 6 may be substituted by time relays, electronic or transistor means or the like.

In FIGURE 8 an example of the invention is shown in more detail. One phase of a three-phase arc furnace is shown with an electrode 18, fed from a three-phase network. A current proportional to the electrode current (I) is fed by a current transformer 33 over a resistance 34 and an amplitude limiter 11 to the input of an integrating amplifier 12. The amplifier comprises a conventional amplifier 35, shunted by a capacitor 36, an inductance 37 and a resistance 38. The whole amplifier then acts as an integrating amplifier, thus integrating the input signal. This input signal is fed over said amplitude limiter 11, for example comprising two parallel branches each with a rectifier and a D.C. source, the rectifiers being oppositely directed, thus limiting the output signal to amplifier 12.

A reference signal $e_{ref.1}$ is also fed to the input of said amplifier 12 over a potentiometer 14, said value being adjustable to a desired value proportional to the desired furnace current (or impedance, etc.).

The output of said integrating amplifier is coupled to a coil 13 of a limit relay, the contact 13a of which switches off the current to the electrode motor 17 at a certain high current value. The output of said amplifier 12 is also coupled to a switch $R_1$, which is controlled by a sampling device such as a motor driven cam disc 19, switching off the electrode motor current according to a cyclical pattern. For stabilizing purposes the output of the amplifier is fed back to the input side of the amplitude limiter 11 (over potentiometer 39). The degree of feedback may be adjusted in a suitable manner in the potentiometer 39.

The device 39 may also be an adjustable amplifier.

We claim:

1. Automatic control system for an arc furnace, comprising an adjusting motor for at least one of the electrodes of said furnace, a driving circuit for said motor, means for measuring a variable magnitude of said furnace, reference means, said driving circuit comprising an integrating amplifier, first connecting means operatively connecting the measuring means and the reference means to the amplifier, second connecting means connecting said amplifier to said motor to control said motor in response to a difference between the outputs of said measuring means and said reference means to control said motor, and means for cyclically opening and closing said driving circuit.

2. In a system as claimed in claim 1, said means operating to open and close the second connecting means.

3. In a system as claimed in claim 1, said last means including cam means and a switch in the driving circuit operatively connected with said cam means.

4. In a system as claimed in claim 1, said last means closing the driving circuit for substantially less than half of each cycle.

5. In a system as claimed in claim 1, said last means closing the driving circuit for not over 20% of each cycle.

References Cited by the Examiner
UNITED STATES PATENTS

| 2,000,723 | 5/1925 | Suits | 314—73 X |
| 2,942,138 | 6/1960 | Carr et al. | 13—13 X |

JOSEPH V. TRUHE, *Primary Examiner.*